US012570575B2

(12) United States Patent
Sandberg et al.

(10) Patent No.: US 12,570,575 B2
(45) Date of Patent: Mar. 10, 2026

(54) BENEFICIATION OF METAL SLAGS FOR USE AS CEMENT MATERIAL

(71) Applicant: CemVision AB, Stockholm (SE)

(72) Inventors: Paul Johan Sandberg, Nokomis, FL (US); Claes Göran Kollberg, Mörbylånga (SE); Mats Erik Åhlin, Borgholm (SE); Francis Louis Kemeny, Lewiston, NY (US)

(73) Assignee: CemVision AB, Stockholm (SE)

( * ) Notice: Subject to any disclaimer, the term of this patent is extended or adjusted under 35 U.S.C. 154(b) by 0 days.

(21) Appl. No.: 19/281,245

(22) Filed: Jul. 25, 2025

(65) Prior Publication Data

US 2025/0353787 A1 Nov. 20, 2025

Related U.S. Application Data

(63) Continuation of application No. PCT/SE2025/050243, filed on Mar. 18, 2025.
(Continued)

(30) Foreign Application Priority Data

Mar. 18, 2025 (WO) ................. PCT/SE2025/050243

(51) Int. Cl.
*C04B 7/17* (2006.01)
*C04B 7/44* (2006.01)
*C21B 3/08* (2006.01)
(52) U.S. Cl.
CPC . *C04B 7/17* (2013.01); *C04B 7/44* (2013.01)

(58) Field of Classification Search
CPC .................................... C04B 7/17; C04B 7/44
See application file for complete search history.

(56) References Cited

U.S. PATENT DOCUMENTS 4,124,404 A 11/1978 Suzuki et al.
6,676,747 B2 * 1/2004 Edlinger .................. C21B 5/04
106/789
(Continued)

FOREIGN PATENT DOCUMENTS

CN 109022645 A * 12/2018 ............... C04B 7/38
KR 101167134 B1 7/2012
(Continued)

OTHER PUBLICATIONS

CN 109022645 A_Machine Translation (Year: 2018).*
(Continued)

*Primary Examiner* — Amber R Orlando
*Assistant Examiner* — Anastasia A. Kuvayskaya
(74) *Attorney, Agent, or Firm* — Davis Wright Tremaine LLP

(57) ABSTRACT

Methods and systems are provided for forming a cement material incorporating an industrial byproduct. In at least one embodiment, a method for forming a cement material includes maintaining a slag as an at least partially molten material and adding one or additives to modify the at least partially molten material. The method further comprises cooling the at least partially molten material to comprise a solid non-metallic fraction with a substantially amorphous molecular structure and a metal fraction that is substantively separated from the solid non-metallic fraction.

20 Claims, 5 Drawing Sheets

Related U.S. Application Data

(60) Provisional application No. 63/566,796, filed on Mar. 18, 2024.

(56) References Cited

U.S. PATENT DOCUMENTS

| | | |
|---|---|---|
| 2015/0159233 A1 | 6/2015 | Wulfert et al. |
| 2016/0107930 A1 | 4/2016 | Wulfert et al. |

FOREIGN PATENT DOCUMENTS

| | | | | |
|---|---|---|---|---|
| WO | 2013015690 | 1/2013 | | |
| WO | 2018107251 | 6/2018 | | |
| WO | WO-2018107251 A1 * | 6/2018 | .............. | C21B 3/08 |

OTHER PUBLICATIONS

WO 2018107251 A1_Machine Translation (Year: 2018).*
International Searching Authority, "Invitation to Pay Additional Fees and, Where Applicable, Protest Fee" in Application No. PCT/SE2025/050243, May 9, 2025, 7 pages.

* cited by examiner

BENEFICIATION OF METAL SLAGS FOR USE AS CEMENT MATERIAL

CROSS-REFERENCE TO RELATED APPLICATIONS

This application is a continuation of International Patent Application No. PCT/SE2025/050243, entitled "BENEFI-CIATION OF METAL SLAGS FOR CEMENT PRODUC-TION" and filed on Mar. 18, 2025, which claims priority to U.S. Provisional Patent Application No. 63/566,796, entitled "BENEFICIATION OF METAL SLAGS FOR USE AS CEMENT MATERIAL" and filed on Mar. 18, 2024. The entire contents of each of the above-identified applications are hereby incorporated by reference for all purposes.

FIELD

Embodiments of the subject matter disclosed herein relate to processes for treating industrial waste materials, and more particularly to systems and methods for incorporating the industrial waste materials into construction materials.

BACKGROUND

Recovery and/or reuse of industrial waste products is desirable to reduce consumption of finite resources. In particular, recycling of byproducts from metallurgical pro-cessing, such as metal slags, is attractive when desirable metals can be reclaimed from the metal slags in a cost-efficient manner. Furthermore, metals slags can be used as raw materials for cement production. By increasing incor-poration of metal slags into new products, a waste footprint of metallurgical processing can be reduced.

While many of the example descriptions throughout this specification pertain to metal slag produced from a steel-making furnace, it is understood by those skilled in the art that most other metal producing furnaces also produce metal slag to some extent. The background, principles and meth-ods described herein must therefore be also considered applicable for treatment and use of metal slags derived from furnaces producing other metals, including but not limited to, copper, aluminum, nickel, silicon, calcium, and ferro-alloys.

SUMMARY

An object of the present invention is to provide a method to modify steelmaking slag in its nascent hot state upon removal from the steelmaking furnace by the addition of suitable reagents to recover iron, remove detrimental ele-ments, and to modify the chemistry to make the resultant modified slag suitable for cement manufacturing.

Another object of the present invention is to control temperature during all phases of the process to maintain a substantially liquid slag, maintain sufficient reaction kinet-ics, and provide for a substantially amorphous material upon solidification. This may be accomplished by controlling an addition rate of reducing agents, buffers, and cooling agents, as well as by forced convection within the bulk of the slag volume. Optionally, the partially or fully molten slag may be stirred during the hot slag processing using a stirring device such as, but not limited to, spent carbon electrodes or wooden logs. The added carbon further enhances the liquid-ity and quality of the recovered metal phase.

Yet another object of the present invention is to provide a process that reduces a manufacturing carbon footprint, makes use of waste or low value materials, and contributes to a circular economy.

In accordance with one of the features of the present invention, there is provided a steelmaking slag that exits a steelmaking vessel into a receiving vessel. A reducing agent selected from a group including ferrosilicon, silicon carbide, carbon, calcium carbide, aluminum, ferroaluminum, cal-cium silicon, hydrogen, waste materials or industrial mate-rials with components including one or more of the forego-ing, or combinations thereof, is added to the receiving vessel. The addition of the reducing agent may be periodic in batches, or may be continuous while the slag is flowing into the receiving vessel to facilitate forced convective mixing of slag and reagent. Optionally, cooling may be implemented and slag modifying reagents may be added, which may be selected from a group including aluminum oxide, calcium oxide, silicon oxide, iron oxide, iron, metal fluoride, and other materials or combinations of materials containing one or more of the foregoing. Optionally, mate-rial addition and mechanically forced convection may be initiated or continued at another station after the slag pour-ing from the steelmaking vessel has been completed. After attaining a desirable composition at desirable temperature, the slag may be quenched and solidified at a suitable rate to produce a substantially amorphous complex oxide suitable in cement manufacturing.

It is understood that the treatment of metal slag from other metal making furnaces may also be utilized in substantively similar ways.

According to a first aspect of the disclosure, a method for forming a cement material comprises maintaining slag as an at least partially molten material after it leaves a furnace, adding additives, and cooling the material to form a solid non-metallic fraction with a substantially amorphous molecular structure and a separated metal fraction. This method enables the creation of cement materials with con-trolled composition and structure.

Optionally in some examples, the method further com-prises separating a solid fraction from the at least partially molten material before cooling. This pre-cooling separation may enhance the control over the final material properties.

Optionally in some examples, separating the solid fraction comprises removing it from the surface of the at least partially molten material. This surface removal may further refine the material composition.

Optionally in some examples, the method further com-prises adding a calcium source to the separated solid frac-tion. Adding a calcium source may enhance certain material properties.

Optionally in some examples, the calcium source is added near saturation levels of the solid fraction. This controlled addition may optimize the calcium content for specific applications.

Optionally in some examples, the calcium source is added to achieve a CaO content greater than 40% in the solid fraction. This specific CaO content may be beneficial for certain material properties.

Optionally in some examples, the separated metal fraction is recycled. This recycling contributes to the sustainability and efficiency of the process.

Optionally in some examples, the slag is a byproduct of an industrial metallurgical process. Utilizing industrial byproducts promotes resource efficiency and reduces waste.

Optionally in some examples, the one or more additives comprises one or more reducing agents to lower an oxygen potential of the slag and remove unwanted cement contaminants from the slag by reduction. This selective removal of contaminants results in a higher quality cement material.

Optionally in some examples, the one or more additives comprises one or more non-metallic slag modifiers to cause a reduced viscosity, a lowered melting temperature, or beneficiation of the chemistry of the slag. Modifying these properties allows for greater control over the cement creation process and the final material characteristics.

Optionally in some examples, the one or more reducing agents comprises one or more of aluminum, ferrosilicon, silicon carbide, calcium, biocarbon, biochar, calcium carbide, hydrogen, recycled waste materials containing the foregoing, or combinations thereof. Using these specific reducing agents provides flexibility and potential cost savings in the cement creation process.

Optionally in some examples, the one or more non-metallic slag modifiers comprises one or more of silica, alumina, metal halide, alkali metal oxide, by-product oxide with low basicity and melting point, or combinations thereof. These specific modifiers enable precise control over the slag properties and the final cement material characteristics.

Optionally in some examples, the at least partially molten material, upon adding the one or more additives, has a CaO to $SiO_2$ ratio of less than 1.4. This specific ratio contributes to the desired properties of the final cement material.

Optionally in some examples, the solid non-metallic fraction has an amorphous content of greater than 90%. This high amorphous content contributes to specific performance characteristics of the cement material.

Optionally in some examples, an outlet of the furnace comprises ports for adding the one or more additives into the at least partially molten material as the at least partially molten material leaves the furnace. This configuration enables efficient and timely addition of additives.

Optionally in some examples, an outlet of the furnace has a geometry configured to induce turbulence in a flow of the at least partially molten material as the at least partially molten material leaves the furnace. This induced turbulence enhances mixing and homogeneity of the molten material.

Optionally in some examples, the at least partially molten material is flowed into a receiving vessel, and the additives are added continuously or in batches as it flows into the vessel. This method of addition allows for precise control over the additive incorporation process.

Optionally in some examples, the additives are added continuously or in batches to the at least partially molten material in a vessel after the molten material has stopped flowing from the furnace. This post-flow addition provides flexibility in the timing of additive incorporation.

Optionally in some examples, the method further comprises determining if the solid non-metallic fraction's amorphous content exceeds a threshold. If above the threshold, it's suitable for cement or supplementary cementitious material; if below, it's suitable as raw material in cement clinkering. This assessment ensures appropriate use of the material based on its properties.

Optionally in some examples, the threshold level is an amorphous content of 90%. This specific threshold provides a clear benchmark for material classification and utilization.

Optionally in some examples, the method further comprises adding a calcium source to the at least partially molten material. Optionally in some examples, the method further comprises adding a calcium source to the solid non-metallic fraction. Adding calcium can enhance certain material properties and tailor the final product for specific applications.

Optionally in some examples, the calcium source is added to the solid non-metallic fraction with amorphous content below the threshold. This targeted addition allows for modification of the material specifically intended for cement clinkering.

Optionally in some examples, the calcium source is added near saturation levels of the at least partially molten material and/or the solid non-metallic fraction. This controlled addition optimizes the calcium content for specific applications and material properties.

Optionally in some examples, the calcium source is added to achieve a CaO content greater than 40% in the partially molten material and/or the solid non-metallic fraction. This specific CaO content may be beneficial for certain material properties and applications.

According to a first aspect of the disclosure, a method for forming a cement material from metal slag comprises adjusting the chemical composition of molten slag to achieve a basicity $(CaO+MgO)/SiO_2$ less than 1.4, adding reducing agents containing silicon or aluminum to recover metals, and rapidly cooling the remaining slag to maintain an amorphous content greater than 50% by weight. This method allows for efficient metal recovery and the creation of cement material with controlled amorphous content from slag.

Optionally in some examples, the remaining portion of the molten slag can be used as a cement replacement material or a Supplementary Cementitious Material. This expands the potential applications of the processed slag.

Optionally in some examples, the remaining portion of the molten slag has an amorphous content greater than 90% by weight. This high amorphous content may enhance certain properties of the cement material.

Optionally in some examples, the reducing agents are added while the slag is molten. This ensures efficient mixing and reaction with the molten slag.

Optionally in some examples, the molten slag is initially cold and re-heated in a furnace. This allows for the use of existing slag materials.

Optionally in some examples, the reducing agents are added to reduce at least one metal in the molten slag. This facilitates metal recovery from the slag.

Optionally in some examples, non-reducing additives, obtained as mining or construction byproducts, are added to adjust the slag chemistry and control the exothermic reaction from the reducing agents. This allows for better control of the process and promotes the use of industrial byproducts.

Optionally in some examples, the silicon and aluminum act as both reducing agents and modifiers for adjusting the viscosity and melting temperature of the slag. This simplifies the process by using the same materials for multiple purposes.

Optionally in some examples, the method further comprises recovering reduced metal from the molten slag by decanting the molten slag in a transport vessel, separating the reduced metal from the slag. This method enables efficient metal recovery and simplifies the separation process.

Optionally in some examples, the method further comprises recovering reduced metal by allowing the molten slag and reduced metal to cool and solidify before mechanically separating them. This method offers an alternative approach to metal recovery, suitable for different processing setups.

According to a second aspect of the disclosure, a method for forming a cement material comprises heating slag in a furnace to become molten material, adding reducing agents to reduce a portion of metal in the molten material, and extracting a contaminant by promoting the formation of a metal-contaminant phase. This method allows for the removal of specific contaminants, resulting in a higher purity cement material.

Optionally in some examples, the contaminant is phosphorus. This specific removal of phosphorus addresses a common contaminant in cement production.

Optionally in some examples, the method further comprises adding a reducing agent to promote the formation of the metal-contaminant phase. This controlled addition enhances the efficiency of contaminant removal.

Optionally in some examples, the method further comprises oxidizing the metal-contaminant precipitate phase to recover the contaminant. This recovery step allows for potential reuse or disposal of the contaminant.

According to a third aspect of the disclosure, a cement material comprises a chemical composition with a basicity of less than 1.4, an amorphous content of at least 50% by weight, and a metal content of less than 10%. This specific composition contributes to desirable properties of the cement material, such as improved strength and durability.

Optionally in some examples, the basicity is obtained according to a ratio of $CaO/SiO_2$. This specific ratio provides a precise measure of the material's basicity and influences its performance characteristics.

Optionally in some examples, the amorphous content of the cement material is at least 90% by weight. This high amorphous content enhances the material's performance characteristics, contributing to improved strength, durability, and reactivity.

Optionally in some examples, the cement material is obtained from industrially produced metal slag. Utilizing industrial byproducts promotes resource efficiency and reduces waste, contributing to a more sustainable cement production process.

Optionally in some examples, the cement material is formed in an electric arc furnace. Electric arc furnaces offer precise control over temperature and processing conditions, enabling the production of high-quality cement materials with specific properties.

BRIEF DESCRIPTION OF THE DRAWINGS

Various embodiments and techniques will be described with reference to the drawings, in which.

DETAILED DESCRIPTION

Figure 1:
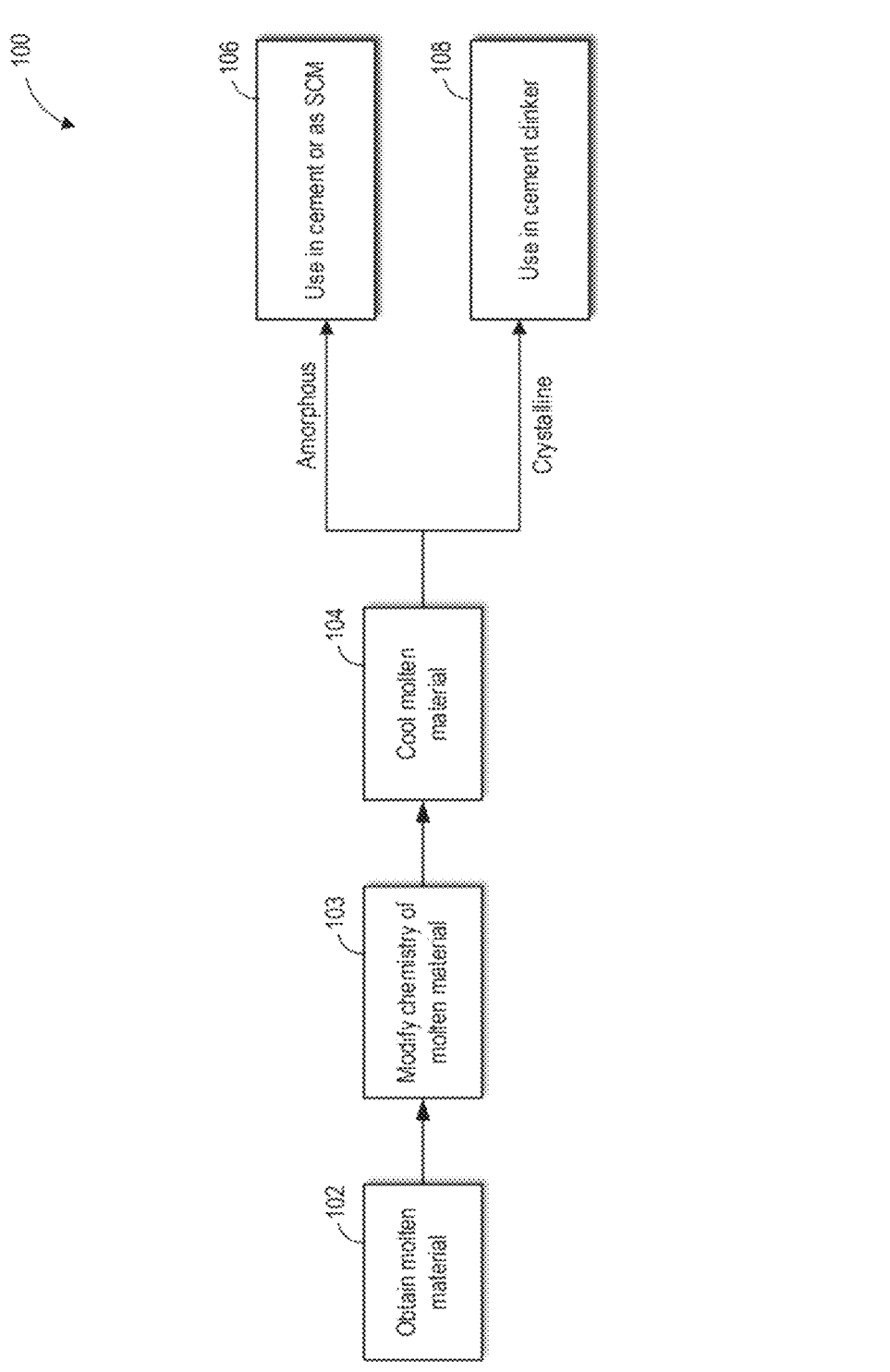
FIG. 1 shows a simplified process flow for obtaining treated metals slags according to end-use, according to an embodiment of the present disclosure.

Industrial metallurgical processes, such as ore smelting or metal scrap recycling in a furnace, may generate mixtures and solutions of compounds known as metal slags. Metal slags may be composed of liquid, solid and gas phases, and may contain metal oxides, sulfides, carbon, and halides, often in ionic form. The chemistry of these slags can be variable, depending on the specific process by which the metal slag is produced. For example, metal slags rich in iron may be formed during steelmaking. Extraction of iron from the iron-rich metal slags may be desirable, for example as described in U.S. Pat. No. 9,650,688, but costs associated with the recovery process may render such extraction economically unattractive. As a result, slags are often discarded despite containing potentially valuable elements.

Discarded slag may have potential use in other industries. For example, some slag materials can be treated to be suitable as road aggregate. In another application, discarded steelmaking slag may be used to neutralize the acid produced by mining operations. These uses of discarded slag may be low value applications and may be limited in the volume of the discarded slag that can be utilized.

One potential use of steel making slag is in cement production. However, slags often contain excessive amounts of elements such as iron, vanadium and chromium, that render them unsuitable for cement production. Upon removal of problematic elements, the metal slags may be used to at least partially substitute materials used in cement production, (e.g., hydraulic binders), including but not limited to production of Portland cements, slag cements, CSA cements, supersulfated cements and geopolymer cements. As another example, the treated metal slags may be used as a Supplementary Cementitious Material (SCM) for Portland cements to improve their production economics, performance properties or carbon footprint. In yet another example, the metal slags may be used as materials for a cement clinker produced in a rotary kiln or fluidized bed which can be electrified given the very low $CO_2$ content in the slag, since the heat demand for the process is much lower than for making cement clinker from limestone. A specific application of the treated metal slags for cement production may depend on the chemical and mineralogical composition and the amorphicity of the slag after beneficiation. For example, a presence of chromium and/or magnesium in the beneficiated slag may be less suitable for use in a cement clinker produced in an oxidizing environment and more suitable for an amorphous slag formed in a reducing environment.

There have been notable attempts at metal recovery and modification of slag to make it suitable for use in cement. For example, in Brazil patent BRP10616813B1, a method is provided to treat converter slag in a separate vessel to reduce iron and then to slowly cool the resulting slag, granulate the slag, separate out solid iron particles, and use the resultant material in cement production. However, this method is energy intensive, time consuming, and has not been proven cost effective. In U.S. Pat. No. 4,124,404, Suzuki et al. describe a method to treat steelmaking slag in several steps, including a reduction step to remove metals to an iron substrate, followed by an oxidation step to remove carbides and add silica to the slag. This method also suffers from complexity, high cost, and higher carbon footprint due to the use of carbon as the primary reductant.

Slag is produced at metal-making temperatures. When removed from metal and discarded, a thermal value of the slag is lost in addition to the discarded material value. Therefore, any process to convert the steelmaking slag to a material suitable for cement production may preferably be done in situ at the steelmaking facility to take advantage of the available thermal energy.

Previous attempts to use chemically modified steelmaking slag in cement manufacturing have focused on removal of detrimental materials and metallic iron. However, there has been little attention paid to the benefit of amorphous versus crystalline material in cement production. The rapid solidification of an oxide of suitable basicity can produce substantially amorphous complex oxides well-suited to cement manufacturing.

While many of the example descriptions throughout this specification pertain to metal slag produced from a steel-making furnace, it is understood by those skilled in the art that most other metal producing furnaces also produce metal slag to some extent. The background, principles and methods described herein must therefore be also considered applicable for treatment and use of metal slags derived from furnaces producing other metals, including but not limited to, copper, aluminum, nickel, silicon, calcium, and ferro-alloys.

Upon removal of problematic elements, metal slags may be used to at least partially substitute materials used in cement production (e.g., hydraulic binders), including but not limited to production of supersulfated cements and geopolymer cements. As described above, the treated metal slags may be used as a Supplementary Cementitious Material (SCM) for Portland cements to improve their physical properties, or used as materials for a cement clinker. A specific application of the treated metal slags for cement production may depend on a composition and how amorphous the metal slags become after beneficiation.

In one example, as described herein, solidification of the treated metal slags may be controlled to impart the resulting material with a sufficient (e.g., a targeted) portion having an amorphous molecular structure. A simplified, high-level process flow 100 for obtaining treated metal slags according to end use is illustrated in FIG. 1. At a first step 102 of the process flow 100, a molten material is obtained. For example, the molten material may be a metal slag that is already substantially molten when obtained from a steel furnace, or may instead include re-melting an already solidified metal slag by heating the metal slag to form an at least partially molten material, hereafter referred to as a molten material for brevity. The molten material (e.g., at least partially molten material) may include a fraction of at least 50% by weight that is in a liquid state.

A chemistry of the molten material may be modified at a second step 103. For example, the molten material may undergo various treatments, as described further below, by addition of various additives and modifiers. The molten material may be cooled at a third step 104, which may, in at least one embodiment, include cooling the molten material rapidly to form an amorphous slag. Upon cooling, a solidified material may form which may be categorized as sufficiently amorphous (e.g., have at least a threshold level of non-crystalline material) or not sufficiently amorphous (e.g., have below the threshold level of non-crystalline material). In at least one embodiment, the threshold level of non-crystalline material is a glass (e.g., amorphous) content of 90% or greater by weight. In at least another embodiment, the threshold level of non-crystalline material is a glass content of 95% or greater by weight. As described herein, a material may be substantially amorphous when the material has an amorphous content of greater than 50% by weight.

If the molten metal slag is cooled to have a high amorphous content of, for example, greater than 90% by weight, the cooled material may be used as a cement material (e.g., a binder) or a SCM at a fourth step 106 of the process flow 100. If, instead, the molten metal slag is not sufficiently amorphous when cooled, the cooled material may be used as raw material in an energized cement clinkering process at a fifth step 108, where energy may be input to the clinkering process via, for example, high temperature heating or low temperature electrolysis.

Cooling of the molten metal slag may be controlled to yield a desired amorphous content. By cooling the metal slag from a high temperature, amorphous state to a solid with high glass content, the material may retain its latent energy (e.g., enthalpy of crystallization).

Compared to metal slag cooled to become crystalline, the cooled metal slag that retains an amorphous structure (e.g., molecular structure) is more reactive and is therefore more useful as a cement material upon activation.

Figure 2:
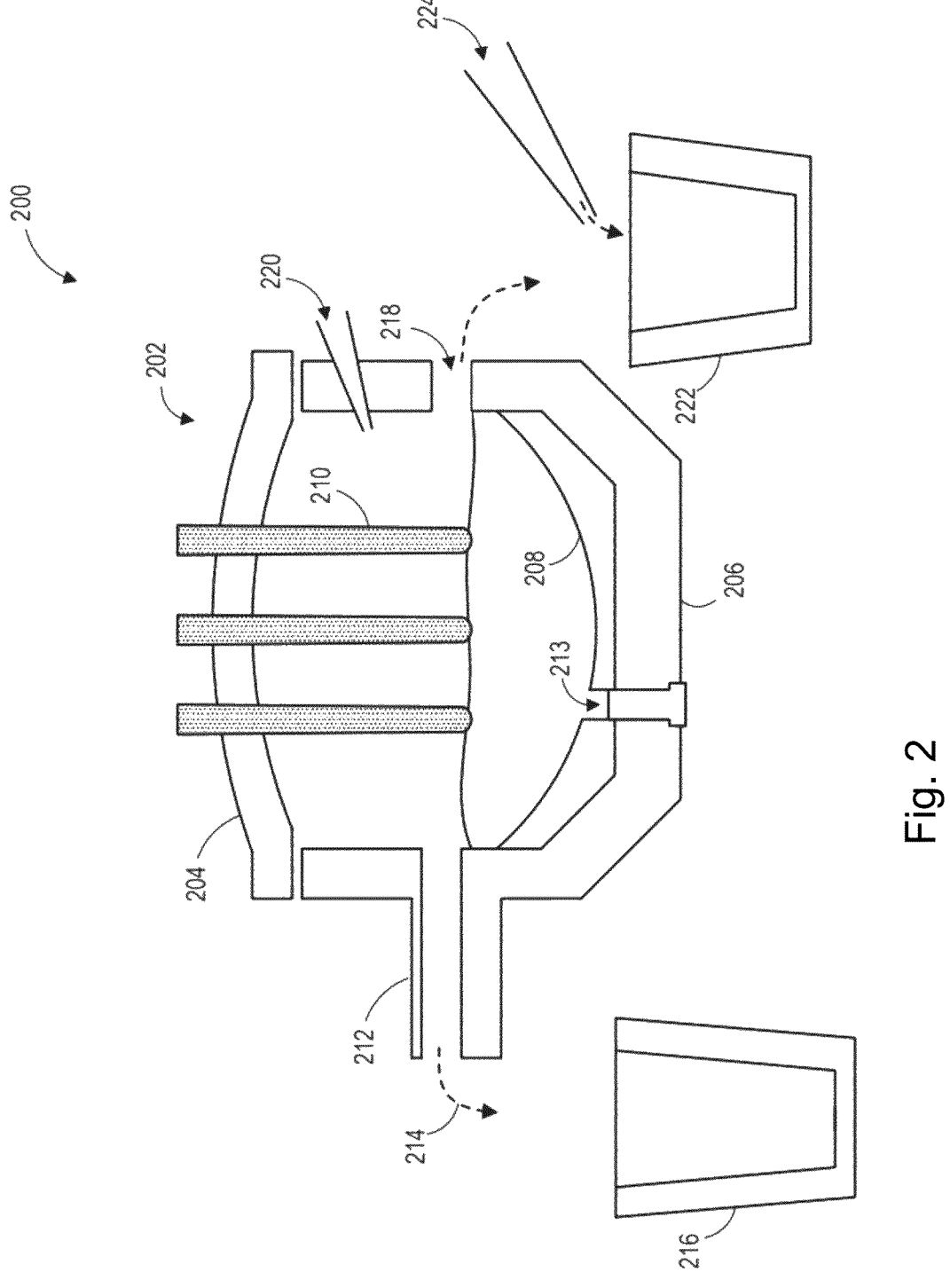
FIG. 2 shows a simplified process for treating metals slags for metal recovery and use as industrial raw materials, according to an embodiment of the present disclosure.

Metal slags may be treated in an exemplary system 200, as illustrated in FIG. 2. In at least one embodiment, the system 200 includes an electric arc furnace 202, although other types of furnaces may be used. The electric arc furnace 202 may include a roof 204, a shell 206 and a refractory material 208 lining a bowl of the shell 206. The roof 204 may also be lined with the refractory material and may be retractable to allow charge material, the charge material typically comprising metal scrap, fluxes, and additives, to be added to the bowl of the shell 206. The roof 204, as well as sidewalls of the shell 206, may include cooling infrastructure, such as coolant passages, to cool the roof 204 and the shell 206 during operation of the electric arc furnace 202. Electrodes 210 may be inserted through the roof 204, which may be, for example, formed of graphite, and may extend into an inner volume of the shell 206.

The electrodes 210 may be coupled to an electrical power grid and, when a voltage is applied to the electrodes 210, a high-voltage arc is created which passes a current through the charge material. The charge material may melt due to the flow of current and to radiant heat produced by the high-voltage arc. Depending on the product, the charge within the electric arc furnace 202 may reach temperatures as high as approximately 1800° C. during operation.

A spout 212 may extend from a side wall of the shell 206 of the electric arc furnace 202 through which the molten product may flow when the electric arc furnace 202 is tilted (e.g., tapping), as indicated by arrow 214. In other words, the spout 212 may be an outlet of the electric arc furnace 202. The molten material may be received by a receiving vessel 216. Additionally or alternatively, the electric arc furnace 202 may include a bottom tap hole 213, which may be used instead of the spout 212 for rapid tapping and better separation of slag from metal. The bottom tap hole 213 may be eccentrically located in a bottom of the electric arc furnace 202 and the receiving vessel 216 may instead be positioned directly below the bottom tap hole 213 to receive the molten product. Some metal and slag may be retained within the furnace after tapping, thus improving energy efficiency and prevention of slag flow into the receiving vessel 216.

In at least one embodiment, a transport vessel such as a ladle or a slag pot 222 may be used to transport the molten product. An opening 218 may be positioned in the back side of the furnace to facilitate removal of slag from the surface of the metal within the electric arc furnace 202. Oxygen and carbon may be injected into the furnace charge through one or more injection ports 220 to generate chemical energy and increase slag volume through foaming. As the slag volume increases, slag may flow from the furnace 202 through the opening 218 into the slag pot 222. The furnace may be tilted backwards a small amount to enhance slag flow from the electric arc furnace 202 into the slag pot 222. The slag flowing into the slag pot 222 may contain solid, liquid and gas phase materials, including metal oxides, carbon, and gaseous carbon oxides. Reagents may be added to the slag pot through an additions chute 224, either before, during, or after flow of slag from the electric arc furnace 202 into the slag pot 222. The reagents may include, for example, reductants, fluxes and cooling agents to modify the slag in the slag pot 222 to enhance a suitability of the slag for use in cement production. The molten material in the slag pot 222 may be transported to another location for further treatment. For example, the molten material may be transported to granulation equipment, e.g., a granulator, for rapid cooling of the slag to minimize crystallization and processing the molten material into a solid granular product. Alternatively, the molten material may be transported to another furnace for additional treatment. Further details of the metal slag beneficiation and processing are provided below.

In at least one embodiment, the molten slag material may be transferred directly to the granulation equipment as it exits the furnace, for example, while flowing through opening 218 into an integrated channel for directing flow. In such instances, as described herein, reagents may be introduced to the molten material through inlets or ports in the integrated channel. For example, as the molten material flows out of opening 218, reagents may be added to the molten material via the inlets or ports of the integrated channel. In some embodiments, the integrated channel may be shaped to induce turbulence such that the reagents introduced may be mixed into the flow of the molten material. Reactions which would otherwise be conducted in the slag pot 222 or in another furnace, may instead be rapidly facilitated in the integrated channel during flow of the molten material from the electric arc furnace 202 into the granulation equipment. In this way, the efficiency of the metal slag treatment may be increased while reducing manufacturing costs.

It will be appreciated that the system 200 is a non-limiting example of a system used for metal slag treatment. Variations on the electric arc furnace, the vessel, the type of furnace and vessel used are possible without departing from the scope of the present disclosure. Furthermore, the system 200 may include components and equipment that are not depicted in FIG. 2 for brevity. For example, the furnace may be a basic oxygen converter, copper smelter, aluminum melter, ferro alloy furnace, or other metal producing furnace.

Figure 3:
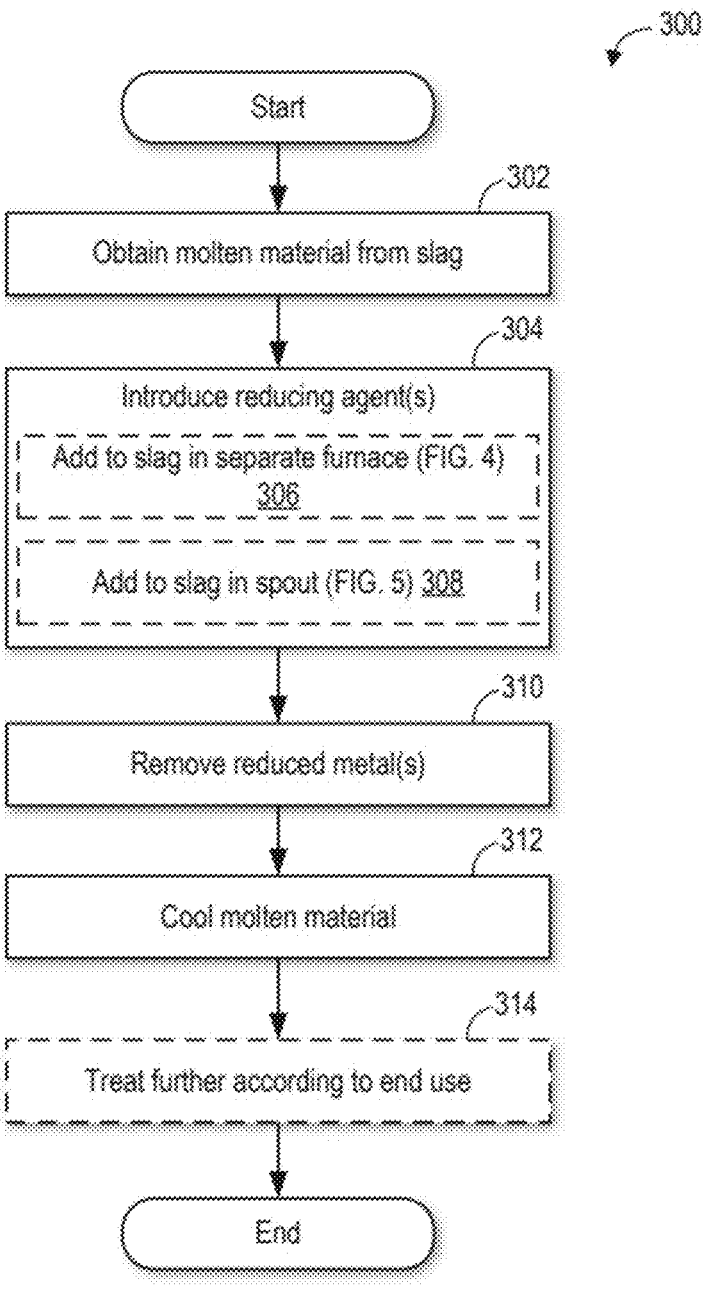
FIG. 3 shows a high level method for treating metal slags, according to an embodiment of the present disclosure.

A system including a furnace and a vessel for receiving a molten material from the furnace, may be used to treat metal slags via a high efficiency process that increases incorporation of metal slags into cementitious materials while reducing overhead costs associated with equipment and energy consumption. An example of a high-level method 300 for treating, e.g., beneficiating, metal slags for use of the metal slags in cement products is shown in FIG. 3. Specific implementations of method 300 are depicted in methods 400 and 500 of FIGS. 4 and 5, respectively. A metal slag may be beneficiated using a system including a furnace, such as an electric arc furnace, a basic oxygen furnace, a smelter, or other type of steel or metal-making furnace, and, optionally, a vessel for receiving and transporting molten material from the furnace. In at least one embodiment, the system may be the system 200 of FIG. 2. Methods 300, 400, and 500 may be carried out as automated processes, manual processes, or a combination thereof.

Turning first to FIG. 3, at 302, method 300 includes obtaining a molten material from a metal slag. In at least one embodiment, obtaining the molten material may include removing the metal slag from the furnace. For example, the metal slag may already be in a molten state due to formation of the slag during a metallurgical process conducted in the furnace, such as steelmaking. The metal slag may be obtained from, but not limited to, scrap melting, smelting, welding, and other metallurgical processes. In at least one embodiment, the metal slag may be a byproduct of steelmaking and may be rich in iron oxides, as well as oxides of other materials such as silicon, calcium, aluminum, magnesium, chromium, vanadium, etc. The metal slag may further include other non-metallic constituents, such as halides, gases, sulfur and phosphorus, among others. The metal slag may also include suspended, entrained or integrated metallic components.

In at least one embodiment, obtaining the molten material at 302 may include reheating the metal slag in the furnace if the metal slag has cooled and solidified. For example, the metal slag may be heated to a temperature to re-melt the metal slag to form the molten material, which may then be removed from the furnace.

One or more reducing agents are introduced to the molten material at 304 of method 300. The reducing agents may include aluminum, ferrosilicon, biocarbon/biochar, calcium carbide, and/or hydrogen, as well as various other recycled metal alloys, compounds, or carbon-containing materials that may act as reducing agents. The aluminum, for example, may be obtained as recycled scrap metal from industrial metal processing and the ferrosilicon may be acquired as a byproduct from ferrosilicon processing. In at least one embodiment, at 306, the reducing agents may be added to the molten material when the molten material is transferred to another, separate furnace for reducing metals in the molten material. Further details of this process are described below with reference to FIG. 4.

In another embodiment, at 308, the reducing agents may be added to the molten material at an outlet (e.g., at the opening 218 or via the additions chute 224 of FIG. 2) of the furnace. For example, the outlet may include ports or inlets to allow the reducing agents to be mixed into the molten material while the molten material flows out of the furnace through the outlet. Further details of this process are described below with reference to FIG. 5.

One or more metals in the molten material that have been reduced are removed from the molten material at 310. For example, iron oxides may be reduced to elemental iron in the molten material and may sink to form a bottom layer of the molten material due to a difference in density. The metals may be removed by decanting off the molten slag suspended above the reduced metal, as one example, but various other methods for separating the reduced metal from the molten slag are possible. In at least one embodiment, at least 75% of the iron in the metal slag may be recovered as metallic iron, for example.

At 312, the molten slag is cooled. As an example, cooling may be achieved using a liquid, such as water, and may be performed at a rate that inhibits crystallization of the molten slag as the molten slag solidifies. In at least one embodiment, the cooling may be performed rapidly if the resulting cooled slag is desired as a pozzolan. In other embodiments, however, any rate of cooling may be applied if the cooled slag is to be used in manufacturing of a cement clinker in a high temperature kiln. In at least one embodiment, at least 50% of the solidified material (e.g., the solidified molten slag) may have an amorphous structure upon solidification. In another embodiment at least 90% of the solidified material (e.g., the solidified molten slag) may have an amorphous structure upon solidification. In yet another embodiment at least 95% of the solidified material (e.g., the solidified molten slag) may have an amorphous structure upon solidification. Other examples of rapid cooling equipment may include a spinning disc, rotating drum, or atomizer.

In embodiments where the slag is only partially molten when transferred from the furnace, solid parts may float on top of the molten slag. This solid fraction can be skimmed or mechanically separated from the surface before the molten slag is rapidly quenched. This separation is particularly beneficial when high amorphous content in the quenched fraction is desired, as the solid fraction typically has higher crystalline content that would reduce overall amorphicity of the cooled material.

In some embodiments, as described further below, the molten material may be cooled first before the reduced metal is removed. In such instances, the solidified material may be granulated and the reduced metal may be removed using a solid phase mechanical or physical separation technique, such as via a magnetic device. In other embodiments, the electric arc furnace (EAF) slag is only partially molten when transferred from the EAF with addition of reducing agents. Solid parts of the EAF slag may be floating on top of the still molten slag, such that the solid fraction can optionally be skimmed from the surface before the molten slag is rapidly quenched in order to maintain <10% crystalline phases in the rapidly quenched fraction of the slag. The fraction of the final slag which, after cooling, has >10% crystalline phases may be preferably used either as raw material for producing cement clinker, or as raw material for producing supersulfated cement, while the fraction of the final slag after cooling that has <10% crystalline phases may be preferably used to replace granulated blast furnace slag in various cement formulations, such as Portland blended cement, slag cement or supersulfated cement. The solidified material optionally undergoes additional treatment according to a desired end use at 314. For example, the solidified material may be heated to become molten again and modifying agents may be added to increase a glassiness (e.g., amorphous content) of the material upon re-solidification or other materials may be added to achieve a target composition of the re-solidified material. The re-solidified material may be pulverized to increase a surface area to volume ratio while reducing its bulk density for use as a cement replacement material or SCM.

While the above description refers to EAF slag, these principles and methods apply to slag obtained from any metal producing furnace, including basic oxygen furnaces, smelters, and other metallurgical processes. Such slag may be partially molten, containing both solid and liquid fractions.

When in this partially molten state, each fraction may follow different treatment paths based on its physical state and intended use. The solid fraction may be used directly as material in cement clinker production, while the molten fraction can undergo further processing for either cement replacement materials or cement clinker applications. This approach maximizes resource utilization while accommodating variations in the slag's initial state.

In some embodiments, the additional treatment may be performed before the molten slag is cooled. As an example, additional reducing agents may be added before cooling to reduce other metals for recovery from the molten material. As another example, the molten material may undergo an oxidation process to oxidize phosphorus that is bound to metals, thereby enabling the phosphorus to be removed as an oxide. The implementation of the additional treatments may vary according to how previous treatment steps are conducted (e.g., in a separate furnace or during transfer of the molten material to receiving structure) as well as end use. The end use applications include raw materials (e.g., binders) for directly replacing or supplementing new (e.g., non-recycled) cement materials and cement clinker materials.

Figure 4:
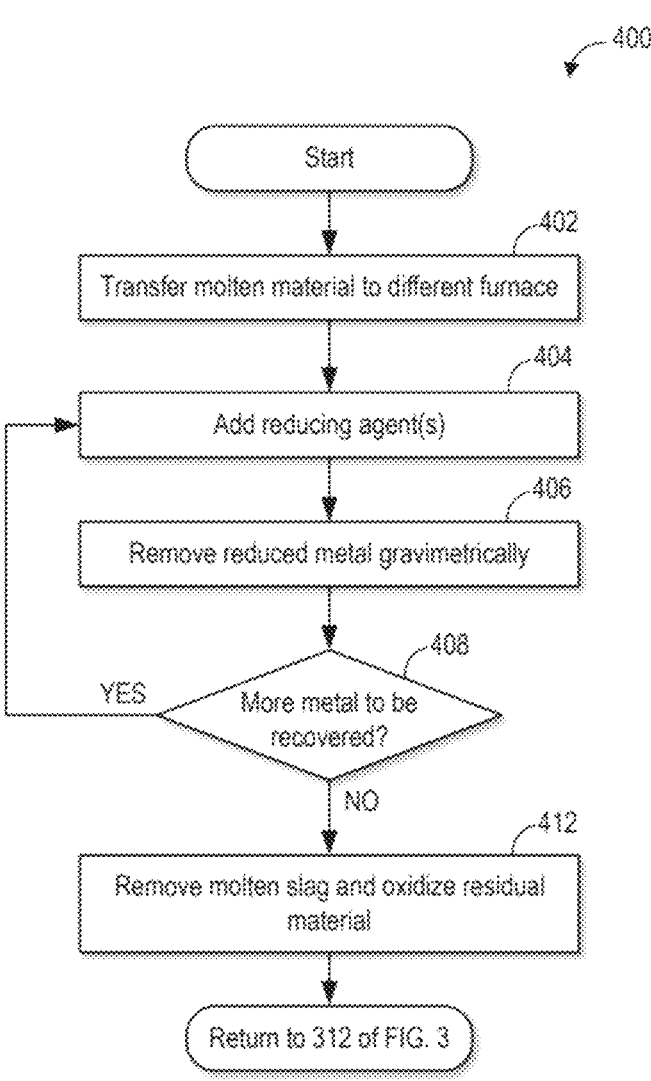
FIG. 4 shows a first implementation of a method for treating metal slags, according to an embodiment of the present disclosure.

Method 400 of FIG. 4 shows an embodiment for treating metal slag when reduction of metals is performed in a secondary furnace, e.g., a furnace in addition to the furnace used to form the molten material. The molten material is transferred to the secondary furnace at 402 of method 400. For example, the molten material may be emptied from the furnace into a transport vessel, such as a ladle or slag pot, and the transport vessel used to add the molten material to the secondary furnace. As another example, the molten material may be transferred directly into the secondary furnace, such as when the secondary furnace is a ladle furnace.

One or more reducing agents are added to the molten material in the secondary furnace at 404. The reducing agents may be any of the reagents described above with reference to 304 of method 300. Further, the type and quantity of reducing agents may be selected based on ability to selectively reduce one or more types of metal in the molten material without inducing binding or precipitation of contaminants, such as phosphorus, with the reduced metals. The selection of the added reducing agents may therefore be determined according to the target metal to be reduced and the specific contaminants to be maintained in the slag phase of the molten material.

Reducing agents may preferably be contacted with the molten slag immediately when the slag leaves the steelmaking furnace. In at least one embodiment, a granular reducing agent may be added into the channel used to transport molten slag into a vessel for removal. In at least another embodiment, granular reducing agent may be added into the vessel used for slag removal. In another embodiment, a granular reducing agent is blown into the molten slag using nitrogen or another suitable carrier gas.

In at least some embodiments, viscosity reducing agents may be added to the molten slag to reduce a solid fraction or change an ionic structure of the molten slag such that the viscosity of the molten slag is decreased in order to facilitate handling of the molten slag. Viscosity reducing agents may include, but are not limited to: metal halides such as fluorspar, or low melting point oxides such as sodium silicate. In at least some embodiments, viscosity reducing agents may be injected separately or together with the reducing agents by gravity or using a carrier gas such as nitrogen. The reducing potential of specific reducing agents can, to some extent, be modeled using thermodynamic software, such as, but not limited to, FactSage. However, it may be necessary to combine thermodynamic modeling with experimentation due to the complexity of some oxide/metal/halide/gaseous systems. Such experimentation may preferably be first carried out in a small laboratory furnace capable of handling molten slags at temperatures higher than industrial steel making furnaces, in order to characterize the effect of introducing additives into the iron rich slag. The results of such experimentation combined with thermodynamic modeling provides directional knowledge for the next step, which comprises larger scale laboratory tests yielding test conditions and results that are more directly comparable with industrial use. Key aspects of said tests include, besides the metal reduction efficiency, the ability to control the temperature and viscosity of the molten slag such that it can flow to facilitate transportation, removal of reduced metals, and efficient granulation into a granulated slag with >90% amorphous content, and preferably >95% amorphous content. In at least one embodiment, scrap reducing metal and metal alloys, including reducing elements such as aluminum, silicon or carbon, which may or may not be coated with carbohydrates or other non-metallic material, may be shredded, ground or otherwise prepared to a suitable size fraction. The prepared scrap reducing metal and metal alloys may be brought into contact with the molten slag in several possible ways, including: a) Feeding by gravity or with a carrier gas into the molten slag exit channel from the steelmaking furnace, b) Feeding by gravity or with a carrier gas into the molten slag contained within a carrier or transport vessel used to collect and transport the molten slag, c) Feeding by gravity or with a carrier gas into the molten slag by stepwise addition of reducing agents at different stages in the reduction process. For example, the step wise addition of reducing agents may include adding the reducing agents such that in a first vessel/compartment, partial reduction yields reduced metal free of certain contaminants such as phosphorus, after which the metal fractions may be separated based on its higher density. This may be performed prior to optional further addition of reducing agents in order to reduce and separate additional metal fractions with higher levels of contaminants. The stepwise addition of reductant may allow recovery of different metal fractions with different application values such as, but not limited to, raw materials for the metals industry, fertilizers, or aggregates. As such, the metal fractions may be substantively separated from material to be used in cement production, where substantively separated refers to removal of at least 90% of an amount of the respective metal from the remainder of the material that the metal is removed from.

It will be known to those skilled in the art that reducing reactions may be controlled to selectively reduce certain materials from an ionic slag bath. As increments of strong reducing agents are added, a slag bath with high oxygen potential becomes progressively more reduced. Easily reducible elements, such as phosphorus, nickel, and iron may first be reduced to their elemental state, followed by manganese and chromium, for example, as additional reducing agents such as aluminum or carbon are introduced. The process temperature and the relative activities of elements, oxides and ions within the system may also govern the amount of reduction of each oxidized element. Therefore, with the knowledge of thermodynamics of the slag/metal system in the process, reducing agents may be selected and added in amounts appropriate to the desired outcome of where each element will report, e.g., to metal, slag, or a gaseous state. The reduction process may be halted and optionally continued to achieve various states of oxidation at various times.

In one example, when the target metal is iron, one or more reducing agents may be added, preferably under predetermined conditions, to facilitate reduction of approximately 75% of the iron content to elemental iron. The reduction of iron oxide content in the slag may improve its usability in cement production. In addition, the reduced metal may have recoverable value, thereby further enhancing the benefits of the reduction reaction. Furthermore, the metals may be separated from the molten oxide slag such that the metals do not include more than tolerable amounts of contaminants such as phosphorus therein, which may obviate further treatment of the metals to remove the contaminants.

In some embodiments, such as when the molten material is to be used as a replacement cement material or a SCM, the final oxide chemistry may be targeted to promote a desired minimum content of amorphous material after solidification. This may be done by appropriate selection of reducing agent and fluxing agent combinations. For example, reducing agents rich in aluminum and silicon may lower the solidification temperature and modify the viscosity of the molten material such that the solidified material may have an amorphous content (e.g., a proportion of its structure may be amorphous) that meets a threshold percentage. The aluminum and/or silicon-rich reducing agents may include scrap aluminum metal, scrap silicon carbide, ferrosilicon fines, or other industrial discarded materials or byproducts that find limited use elsewhere.

Another way to reduce the solidification temperature of the target slag may be to add fluxing materials that contain silica, alumina, or other solvent oxides, such as, but not limited to, silica rich recycled glass, incineration ash from solid waste management, fly ash from coal combustion, and other waste or byproduct oxides. In one example, a combination of the aforementioned fluxing materials may be added to achieve a chemistry which, upon rapid cooling of the molten oxide material, inhibits crystallization as the solidified material forms.

An amount and distribution of the reducing agents (e.g., relative proportions of aluminum and silicon-containing reagents) may be determined based on a target chemistry or basicity of the molten material, where the basicity is defined as the mass fraction shown below in equation 1:

$$\text{Basicity} = CaO/SiO_2 \tag{1}$$

Other forms of basicity calculation are also used in the art, such as optical basicity, electronegativity, $(CaO+MgO)/SiO_2)$, $(CaO+MgO)/(SiO_2+Al_2O_3)$. It will be obvious to those skilled in the art that the selection of basicity ratio, or development of any new ratio definition, is based on pragmatic determinations and utility of each ratio for the purpose of defining specific material properties and behaviors. Those skilled in the art may set target values for a preferred definition of basicity, such as a basicity of less than 1.4

In at least one embodiment, in order to obtain the solidified material with an amorphous content of greater than 90%, for example, a basicity of less than 1.4, as determined by Equation 1, may be desired. In at least one embodiment, the basicity may be less than 1.4 based on the ratio of $(CaO+MgO)/SiO_2$. In yet another embodiment, the basicity may be less than 1.4 based on the ratio of $(CaO+MgO)/(SiO_2+Al_2O_3)$. The reducing agent may therefore be selected to have more than one effect on metal slag, such as enabling both recovery of target metals and controlling the structure and composition of the solidified material.

At 406, the reduced metal is removed gravimetrically from the secondary furnace. As an example, the molten elemental iron may have a higher density than the molten slag (e.g., the remaining molten material with the reduced iron forming a separate phase from the molten slag) and may therefore form a layer below the molten slag. For example, the secondary furnace may include a drain or outlet from which only the bottom layer may be removed from the secondary furnace.

At 408, method 400 includes confirming if more metals are to be recovered. For example, extraction of a different type of metal that has industrial application or market value may be desired. For example, metals such as chromium and vanadium are useful in various industries and may be recovered from the metal slag without demanding additional equipment and associated overhead costs. If additional recovery of a metal is required, method 400 returns to 404 to add one or more reducing agents to facilitate the additional metal reduction. If no additional metal is to be recovered, method 400 proceeds to 412 to remove the molten slag and oxidize residual material therein.

At 412 of method 400, the molten slag is transferred from the reduction process step and cooled, as described at 312 of method 300, and, optionally, treated further according to end use. The remaining material, e.g., metal-phosphorus phases, may be oxidized in a separate furnace to convert the phosphorus to phosphates to allow the phosphates to be recovered and used, for example, in fertilizers. In at least one embodiment, the reduction may take place in a secondary furnace that can further be adjusted to operate in an oxidation mode to inject oxygen into the remaining molten slag and metal-phosphorus phases. In at least another embodiment, the remaining material may be transferred to another furnace for oxidation to remove phosphate from the metal phase. Optionally, in at least one embodiment, residual material, such as phosphorus, present in the recovered metal phases may also be treated by oxidizing the metal phases.

Figure 5:
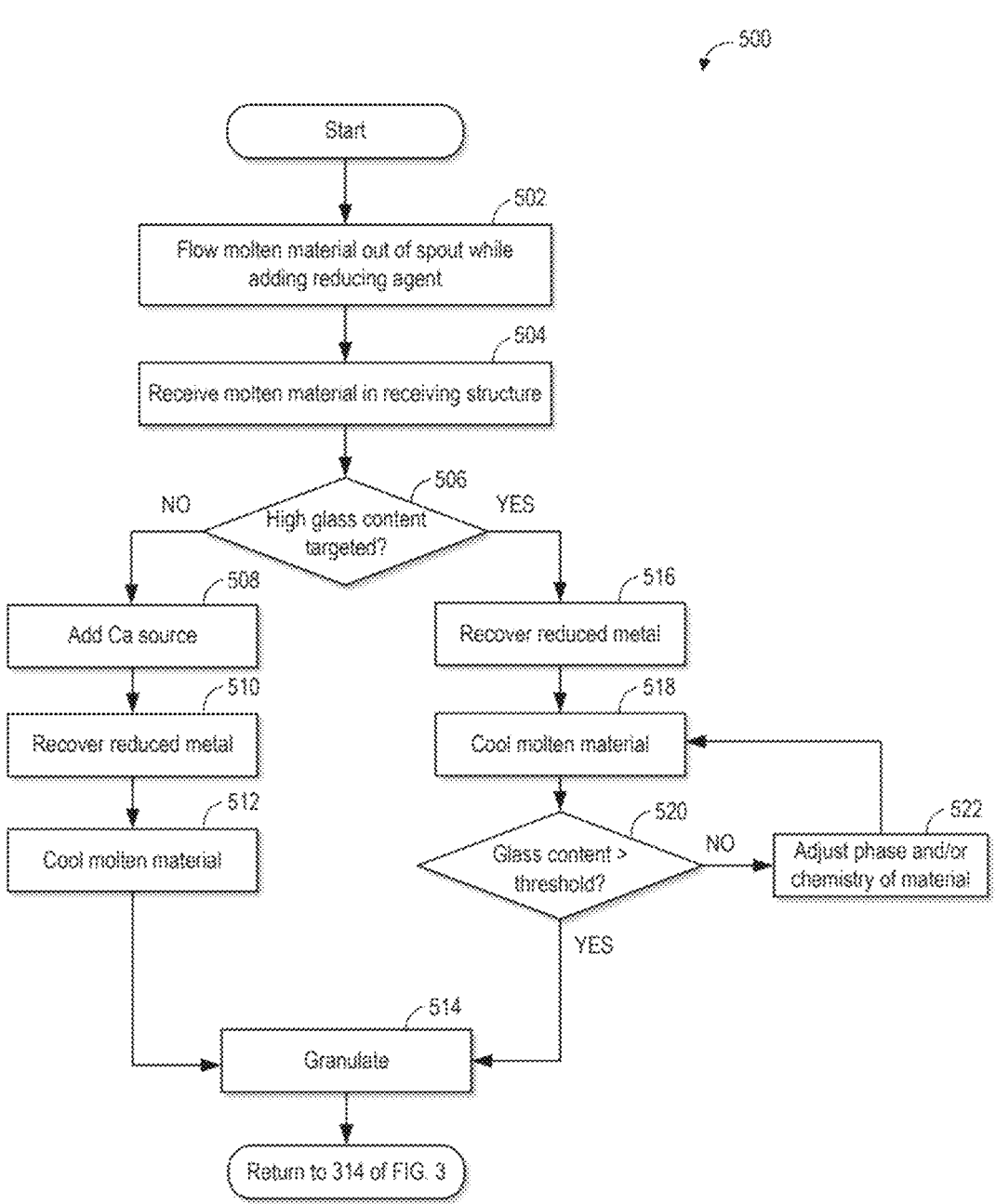
FIG. 5 shows a second implementation of a method for treating metal slags, according to an embodiment of the present disclosure.

Turning now to FIG. 5, method 500 shows an embodiment for treating metal slag when reduction of metals is performed in an outlet of the furnace in which the metal slag is heated to become the molten material. At 502, method 500 includes flowing the molten material out of the outlet of the furnace while one or more reducing agents are mixed into the molten material. For example, the molten material may be transferred to a transport vessel, such as a ladle or slag pot, or directly to a granulator through the outlet. As described above, the outlet may have inlets or ports that enable reagents to be introduced to the flow of molten material. As one example, gas-phase reducing agents may be added to the molten material using tubes or pipes that enable the gas-phase reducing agents to be blown or injected into the outlet. The gas-phase reducing agents may serve a secondary purpose of mixing the molten metal slag material to improve mass transport and reaction rates. Further, the outlet may be shaped to induce turbulence in the flow of molten material such that the added reducing agents are efficiently mixed into the molten material as the molten material flows.

Although the molten material is removed from a source of heat as it flows through the outlet out of the furnace, the addition of the reducing agents, particularly aluminum and silicon, may generate sufficient heat during metal reduction to maintain the material molten. As discussed previously, the type of reducing agents mixed into the molten material may be selected to inhibit formation of undesirable metal-contaminant phases. When the molten material, along with the reduced metals, is received in the receiving structure (e.g., the transport vessel or the granulator) at 504, the reduced metal may form a higher density layer below the molten slag. The temperature of the molten slag and the reduced metal may remain high from the heat generated during reduction of the metal, where the reduction reaction, depending on stoichiometry and kinetics, may continue after transfer of the molten material is complete.

In some instances, one receiving structure may be preferred over the other depending on desired end use. For example, when the slag is to be used as a cement replacement material or a SCM, transfer of the molten slag from the furnace into the granulator may be preferred, although the ladle may also be used. When the slag is to be used in a cement clinker, transfer of the slag into the ladle may be preferred to leverage heat generated by the reduction reaction to facilitate additional treatment, as described further below.

At 506, method 500 includes confirming whether a high amorphous content of the solidified slag has reached a pre-determined target, which may include removing, rapidly cooling, and analyzing a sample composition by, for example, X-ray diffraction. For example, an amorphous content of greater than 90% may be desired when the solidified slag is to be used as a replacement cement material or SCM to ensure that the solidified slag is sufficiently reactive to be used as such. If, alternatively, the solidified slag is to be used as a cement clinker material, a high amorphous content may not be targeted.

If the high amorphous content is not targeted, method 500 continues to 508 to add a source of calcium to the molten slag while the molten slag is still hot due to the reduction reaction. The calcium source may be, as one example, lime obtained as a mining industry byproduct. Calcium may also be incorporated into the reducing agent, for example in the form of calcium carbide, calcium silicon alloy, or ferrocalcium. An amount of the calcium source may be, as one example, chosen in an amount so as to approach the saturation level of the molten slag with calcium. As used herein, "approaching the saturation level" means adding calcium to achieve at least 80% of the maximum calcium content that can be incorporated into the material at the prevailing conditions without precipitation of solid calcium compounds. In some embodiments, the calcium source is added in an amount sufficient to achieve a CaO content of greater than 40% in the material, which may be beneficial for certain cement clinker applications. The calcium source may be added at various stages of the process depending on the specific application requirements. The calcium source may be added to the molten material, to the solidified slag after cooling, or to the solid fraction that was separated from the partially molten material. The calcium source may include lime from mining byproducts, limestone, calcium carbonate, calcium hydroxide, calcium oxide, or other calcium-containing industrial materials.

The reduced metal is recovered, e.g., separated, from the molten slag at 510. For example, when the calcium addition is performed in a slag pot, the ladle, or other secondary container, the molten slag may be decanted and collected from the container, leaving the bottom layer of reduced metal remaining in the container. The molten slag may then undergo an optional additional step to be further reduced for additional recovery of metals before being cooled at 512. Further, recovery and removal of phosphorus, as described with respect to 412 of method 400, may be performed. Cooling the molten slag may include cooling the molten slag to solidify in a cost efficient manner as a specific cooling rate of the molten slag is not demanded when the molten slag is to be used in a cement clinker.

At 514 of method 500, the cooled and solidified slag is transferred to size reducing equipment to be processed into a finely divided material. For example, the solidified slag may be processed to have a desired particle size distribution. Method 500 returns to 314 of method 300.

In instances where the molten material is received directly in the granulator, the additive for reducing and/or modifying the slag chemistry may be added to the molten material while the molten material is flowed through the outlet into the granulator for efficient removal of volatile species from the additive source. The molten material may be cooled first before recovering the reduced metal. In other words, cooling at 512 of method 500 may be performed before recovery of the reduced metal at 510. The reduced metal may be separated from the cooled and solidified slag mechanically, e.g., magnetically. In this example, further recovery of other metals may require that the solidified slag be returned to the furnace to again form a molten material. As such, when metal recovery is to be performed more than once, receiving the molten material in the ladle may be preferred.

Returning to 506, if the high amorphous content is targeted, method 500 proceeds to 516 to recover the reduced metal. In at least one embodiment, when the molten material is received in the ladle, the molten slag, forming a layer above the reduced metal, may be decanted and collected for further processing. For example, reducing agents may optionally be added again to recover additional metals from the molten slag. Further, recovery and removal of phosphorus, as described with respect to 412 of method 400, may be performed. The molten slag is cooled at 518 to form a solidified material. In at least one embodiment, as described previously, the cooling may be performed rapidly to obtain a pozzolan, or to obtain a material with a desired amorphicity. In one example, the molten slag may be transferred to the granulator and allowed to cool in the granulator. Upon cooling and solidifying, the solidified material may be granulated to allow the solidified material to be analyzed for amorphous content.

In at least another embodiment, when the molten material is received in the granulator from the furnace, the molten material may be rapidly cooled first before the reduced metal is recovered. In other words, cooling of the molten material at 518 may be performed before the recovery of the reduced metal at 516. The reduced metal may then be separated from the solidified material magnetically, for example, and the solidified material may be granulated. As described above, further recovery of other metals may require that the solidified slag be returned to the furnace to again form a molten material. As such, when metal recovery is to be performed more than once, receiving the molten material in the ladle may be preferred.

At 520, method 500 includes removing, rapidly cooling, and analyzing a sample to determine if the amorphous content of the solidified material is greater than a threshold. As an example, X-ray diffraction may be used to determine the amorphous content. For example, the threshold may be an amorphous content of 90%. In other examples, the threshold may be 85% or 95%. If the amorphous content is not greater than the threshold, method 500 proceeds to 522 to adjust a phase (e.g., solid versus liquid) and/or chemistry of the material.

In at least one embodiment, adjusting the phase and/or the chemistry of the material may include heating the material to re-melt the material. Further, in a least one embodiment, adjusting the phase and/or the chemistry of the material may include adding modifiers, reductants, or other additives to the material to maintain the material in a molten state and/or to increase the amorphous content of the resulting solidified material. In at least one embodiment, the modifiers may be additives rich in alumina and silica to achieve a slag of lower viscosity, lower solidification temperature, and basicity of the molten material of less than 1.4, as calculated by Equation 1. The molten material may be cooled at 518 after adding the modifiers.

If the amorphous content is greater than the threshold at 520, method 500 continues to 514 to granulate the solidified material. Method 500 returns to 314 of method 300.

As described herein, metal slags may be beneficiated according to a process that increases use of metal slags as cement materials without demanding additional equipment and incurring increased costs with respect to existing systems and methods for treating metal slags. For example, a metal, such as iron, may be efficiently recovered from the metal slags with contaminants prior to incorporation of the metal slags into cement materials without demanding a separate, advanced furnace for the recovery. In some embodiments, the metal slags, when molten, may be transferred directly into a granulator from a simple container, such as a slag pot furnace for adjusting the composition of metal slags, thereby reducing losses caused by use of a transport vessel. Further, additives can be used that both reduce metals in the metal slags for recovery and increase an amorphous content of the beneficiated metal slags (e.g., the solidified metal slags after treatment), which increases a reactivity of the solidified metal slags for use as a cement replacement material or SCM.

In addition, a composition of the beneficiated metal slags may be readily controlled while the metal slags are in the molten state. This allows, for example, the resulting metal slags to be a high quality cement clinker material by enabling addition of materials rich in calcium or aluminate to the molten metal slags while concomitantly driving off volatile materials such as chlorides. When the beneficiated metal slags are to be used as the cement replacement material or SCM, the composition of the beneficiated metal slags may have a desired basicity based on addition of alumina and/or silica while the metal slags are molten. This obviates a need for adjustment of the composition during cement production, which may be a less precise process for attaining desired properties of the cement. As such, the systems and methods described herein provide a flexible, efficient, and low-cost strategy for producing a material for use in cement production that can be optimized according to its end use.

The specification and drawings are to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A method for forming a cement material, the method comprising:

maintaining a slag, the slag to leave a furnace as an at least partially molten material;

adding one or more additives to the at least partially molten material;

separating a solid non-metallic fraction from the at least partially molten material before cooling the at least partially molten material, at least by removing the solid non-metallic fraction from a surface of the at least partially molten material;

adding a calcium source to the solid non-metallic fraction, wherein the calcium source is added in an amount approaching a saturation level of the solid non-metallic fraction with calcium, the amount sufficient to achieve a CaO content of greater than 40% in the solid non-metallic fraction; and cooling the at least partially molten material to comprise the solid non-metallic fraction and a metal fraction that is separated from the solid non-metallic fraction, wherein the solid non-metallic fraction has an amorphous content of greater than 90%.

2. The method according to claim 1, wherein:

the metal fraction is recycled as feed material to an industrial process; and the slag is a byproduct of an industrial metallurgical process.

3. The method according to claim 1, wherein the one or more additives include one or more reducing agents to lower an oxygen potential of the slag and remove unwanted cement contaminants from the slag by reduction, wherein the one or more reducing agents include one or more of aluminum, ferrosilicon, silicon carbide, calcium, biocarbon, biochar, calcium carbide, hydrogen, recycled waste materials containing the foregoing, or combinations thereof.

4. The method according to claim 1, wherein the one or more additives include one or more non-metallic slag modifiers to cause one or more of a reduced viscosity, a lowered melting temperature, or beneficiation of a chemistry of the slag, wherein the one or more non-metallic slag modifiers include one or more of silica, alumina, metal halide, alkali metal oxide, oxide of suitable basicity to produce amorphous complex oxides, or combinations thereof.

5. The method according to claim 1, wherein the at least partially molten material, upon adding the one or more additives, has a CaO to $SiO_2$ ratio of less than 1.4.

6. The method according to claim 1, wherein:

an outlet of the furnace includes ports for adding the one or more additives into the at least partially molten material as the at least partially molten material leaves the furnace; and the outlet of the furnace has a geometry configured to induce turbulence in a flow of the at least partially molten material as the at least partially molten material leaves the furnace.

7. The method according to claim 1, wherein the at least partially molten material is flowed into a receiving vessel and the one or more additives are added continuously or in batches to the at least partially molten material as the at least partially molten material flows into the receiving vessel and/or after the at least partially molten material has ceased to flow from the furnace.

8. A method for forming a cement material, the method comprising:

maintaining a slag, the slag to leave a furnace as an at least partially molten material;

adding one or more additives to the at least partially molten material;

cooling the at least partially molten material to comprise a solid non-metallic fraction and a metal fraction that is separated from the solid non-metallic fraction;

determining if the solid non-metallic fraction has an amorphous content greater than 90%;

if the solid non-metallic fraction is determined to have the amorphous content greater than 90%, preparing the solid non-metallic fraction for use as a cement replacement material or a supplementary cementitious material; and if the solid non-metallic fraction is determined to have an amorphous content less than 90%, preparing the solid non-metallic fraction for use as a raw material in a cement clinkering process.

9. The method according to claim 8, wherein preparing the solid non-metallic fraction for use as the cement replacement material or the supplementary cementitious material comprises rapidly cooling the solid non-metallic fraction to maintain the amorphous content greater than 90%.

10. The method according to claim 8, wherein preparing the solid non-metallic fraction for use as the raw material in the cement clinkering process comprises adding a calcium source to the solid non-metallic fraction.

11. The method according to claim 8, further comprising:

separating the solid non-metallic fraction from the at least partially molten material before cooling the at least partially molten material, at least by removing the solid non-metallic fraction from a surface of the at least partially molten material; and adding a calcium source to the solid non-metallic fraction, wherein the calcium source is added in an amount approaching a saturation level of the solid non-metallic fraction with calcium, the amount sufficient to achieve a CaO content of greater than 40% in the solid non-metallic fraction.

12. The method according to claim 8, wherein:

an outlet of the furnace includes ports for adding the one or more additives into the at least partially molten material as the at least partially molten material leaves the furnace; and the outlet of the furnace has a geometry configured to induce turbulence in a flow of the at least partially molten material as the at least partially molten material leaves the furnace.

13. A method for forming a cement material, the method comprising:

maintaining a slag, the slag to leave a furnace as an at least partially molten material;

adding one or more additives to the at least partially molten material; and cooling the at least partially molten material to comprise a solid non-metallic fraction and a metal fraction that is substantively separated from the solid non-metallic fraction, wherein the solid non-metallic fraction has an amorphous content of greater than 90%, wherein an outlet of the furnace includes ports for adding the one or more additives into the at least partially molten material as the at least partially molten material leaves the furnace, and wherein the outlet of the furnace has a geometry configured to induce turbulence in a flow of the at least partially molten material as the at least partially molten material leaves the furnace.

14. The method according to claim 13, further comprising adding a calcium source to the at least partially molten material, wherein the calcium source is added in an amount approaching a saturation level of the at least partially molten material with calcium, the amount sufficient to achieve a CaO content of greater than 40% in the at least partially molten material.

15. The method according to claim 13, further comprising separating the solid non-metallic fraction from the at least partially molten material before cooling the at least partially molten material, at least by removing the solid non-metallic fraction from a surface of the at least partially molten material.

16. The method according to claim 13, wherein:

the metal fraction is recycled as feed material to an industrial process; and the slag is a byproduct of an industrial metallurgical process.

17. The method according to claim 13, wherein the one or more additives include one or more reducing agents to lower an oxygen potential of the slag and remove unwanted cement contaminants from the slag by reduction, wherein the one or more reducing agents include one or more of aluminum, ferrosilicon, silicon carbide, calcium, biocarbon, biochar, calcium carbide, hydrogen, recycled waste materials containing the foregoing, or combinations thereof.

18. The method according to claim 13, wherein the one or more additives include one or more non-metallic slag modifiers to cause one or more of a reduced viscosity, a lowered melting temperature, or beneficiation of a chemistry of the slag, wherein the one or more non-metallic slag modifiers include one or more of silica, alumina, metal halide, alkali metal oxide, oxide of suitable basicity to produce amorphous complex oxides, or combinations thereof.

19. The method according to claim 13, wherein the at least partially molten material, upon adding the one or more additives, has a CaO to $SiO_2$ ratio of less than 1.4.

20. The method according to claim 13, wherein the at least partially molten material is flowed into a receiving vessel and the one or more additives are added continuously or in batches to the at least partially molten material as the at least partially molten material flows into the receiving vessel and/or after the at least partially molten material has ceased to flow from the furnace.

* * * * *